United States Patent
Hamming

(10) Patent No.: US 7,066,420 B2
(45) Date of Patent: Jun. 27, 2006

(54) TAPE DRIVE APPARATUS HAVING AN ARRANGEMENT FOR CAPTURING AND RETAINING A LEADER PIN FROM A TAPE CARTRIDGE

(75) Inventor: John A. Hamming, San Clemente, CA (US)

(73) Assignee: Certance LLC, Scotts Valley, CA (US)

( * ) Notice: Subject to any disclaimer, the term of this patent is extended or adjusted under 35 U.S.C. 154(b) by 145 days.

(21) Appl. No.: 10/739,287

(22) Filed: Dec. 19, 2003

(65) Prior Publication Data

US 2004/0129816 A1   Jul. 8, 2004

Related U.S. Application Data

(60) Provisional application No. 60/435,671, filed on Dec. 19, 2002.

(51) Int. Cl.
*G11B 15/66*   (2006.01)
(52) U.S. Cl. .................... 242/332.4; 242/332.8; 360/95
(58) Field of Classification Search .......... 242/332.4, 242/332.7, 332.8; 360/95
See application file for complete search history.

(56) References Cited

U.S. PATENT DOCUMENTS

| 6,034,839 A | 3/2000 | Hamming |
| 6,082,652 A | 7/2000 | Theobald |
| 6,622,475 B1 | 9/2003 | Brault et al. |
| 6,814,324 B1 * | 11/2004 | Gavit et al. ............ 242/332.4 |

* cited by examiner

*Primary Examiner*—John Q. Nguyen
(74) *Attorney, Agent, or Firm*—Thelen Reid & Priest LLP

(57) ABSTRACT

A tape drive apparatus with an arrangement for capturing, retaining and releasing a leader pin from the tape cartridge provides a leader pin holding assembly having a body and a swing pivotally coupled to the body. Upon movement into the tape cartridge, the swing is controllably pivoted against the force of a spring into an open position to capture the leader pin within the tape cartridge. Closing the swing retains the leader pin between the swing and the body of the leader pin holding assembly. A minimum number of external actuators is achieved by employing a hub leader that controls the opening and closing of the swing with relation to the body.

10 Claims, 11 Drawing Sheets

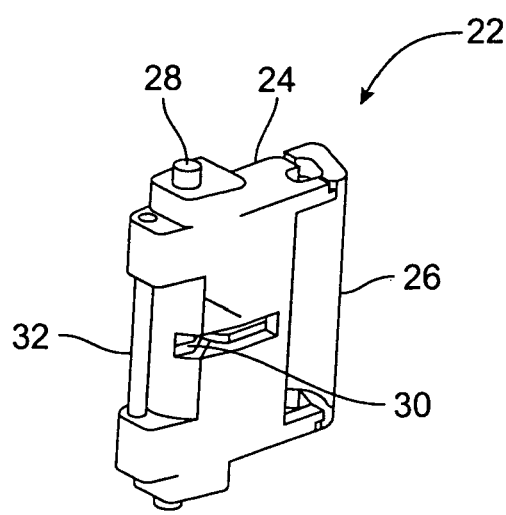 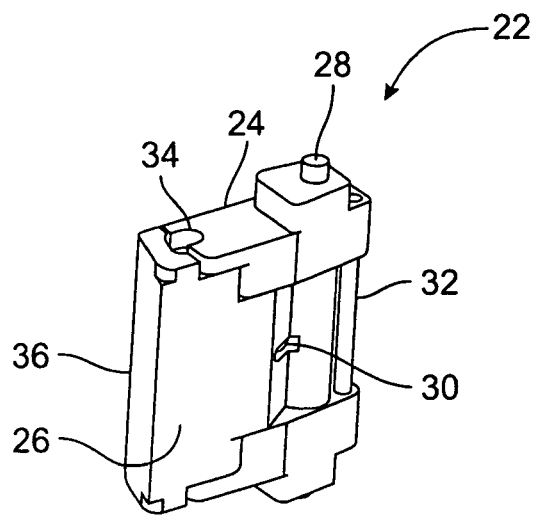
FIG. 2A  FIG. 2B
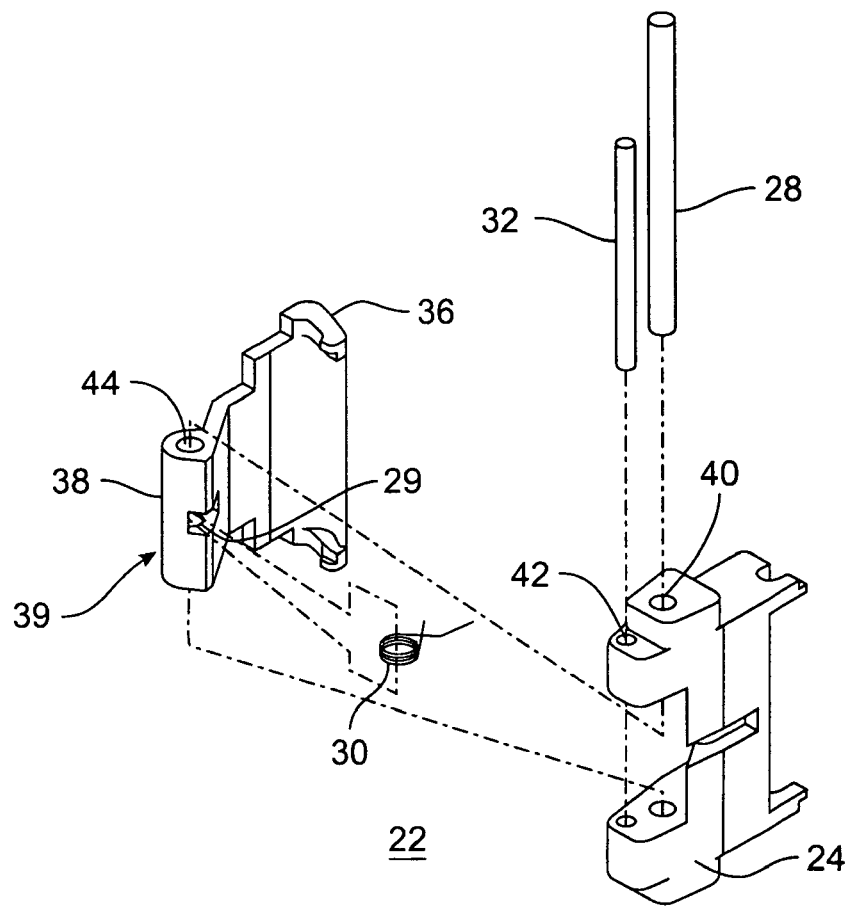
FIG. 3

TAPE DRIVE APPARATUS HAVING AN ARRANGEMENT FOR CAPTURING AND RETAINING A LEADER PIN FROM A TAPE CARTRIDGE

RELATED APPLICATIONS

This application claims priority from Provisional Application Ser. No. 60/435,671 filed on Dec. 19, 2002 entitled: "APPARATUS FOR GRABBING AND RETAINING A LEADER PIN", the entire disclosure of which is hereby incorporated by reference herein.

FIELD OF THE INVENTION

The present invention relates to a tape drive apparatus for threading tape from a single reel cartridge onto a take-up reel, and more specifically, to a tape drive apparatus with an arrangement for capturing and retaining a leader pin from a tape cartridge.

BACKGROUND OF THE INVENTION

There are a number of tape drive mechanisms in practice and designs for threading tape from a single reel cartridge onto a take-up reel. These various mechanisms deploy a variety of methods for grasping the leader pin from the cartridge. In practice, the leader pin grabbing device must capture and release the leader pin at the proper times and fit into the take-up reel in a manner that maintains the cylindrical nature of the take-up reel.

Once the leader pin is grabbed at the cartridge, the tape attached to the leader pin is threaded by moving the grabbing device with the leader pin to the take-up reel. Some designs employ a leader attached to the take-up reel, while other designs employ an external mechanism to move the grabbing device.

The leader pin grabbing device has the task of capturing and releasing the leader pin from the single reel cartridge. The device must be able to hold the leader pin when the tape tension is both high and low. It is desirable, from a number of manufacturing perspectives, to provide a device that utilizes a minimum amount of external actuators, such as motors, solenoids, etc.

SUMMARY OF THE INVENTION

There is a need for a leader pin grabbing device that is able to capture and retain a leader pin employing a minimum amount of external actuators, and is able to hold a leader pin when tape tension is both high and low.

This and other needs are met by embodiments of the present invention which provide a tape drive apparatus with an arrangement for capturing and retaining a leader pin from a tape cartridge. The tape drive apparatus comprises a holding assembly having a body and a capture element movable with respect to the body between an open position to capture the leader pin and a closed position to retain the leader pin within the holding assembly between the capture element and the body.

In certain embodiments of the invention, the capture element is pivotally mounted to the body to swing between the open and closed positions.

Another aspect of the invention, a tape drive is provided comprising a take-up reel and means for capturing and releasing a leader pin of a tape cartridge.

The foregoing and other features, aspects and advantages of the present invention become more apparent from the following detailed description of the present invention when taking in conjunction with the accompanying drawings.

BRIEF DESCRIPTION OF THE DRAWINGS

FIGS. 2a and 2b are perspective views from opposite sides, respectively, of a leader pin holding assembly constructed in accordance with embodiments of the present invention.

FIG. 3 is an exploded view of the leader pin holding assembly of FIG. 2.

FIG. 4b depicts a cross-section of the leader pin holding assembly taken along line IVb—IVb shown in FIG. 4a.

FIG. 9b is a top view of the manipulator gear train assembly in FIG. 9a.

DETAILED DESCRIPTION OF THE INVENTION

The present invention addresses and solves problems related to the capture and release of a leader pin from a single reel cartridge in tape drive arrangements. This is achieved by the present invention employing a holding assembly having a body and a capture element movable with respect to the body between an open position that captures the leader pin and a closed position to retain the leader pin within the holding assembly between the capture element and the body. The use of a capture element that is movable with respect to the body to retain a leader pin within the holding assembly between the capture element and the body provides a mechanism for grabbing and releasing the leader pin only when it is in the cartridge, allows the performing of the grab and release with a minimum number of external actuators, maintains a hold of the leader pin regardless of tape tension, and fits into a take-up reel in a manner that maintains a cylindrical nature of the take-up reel.

Figure 1:
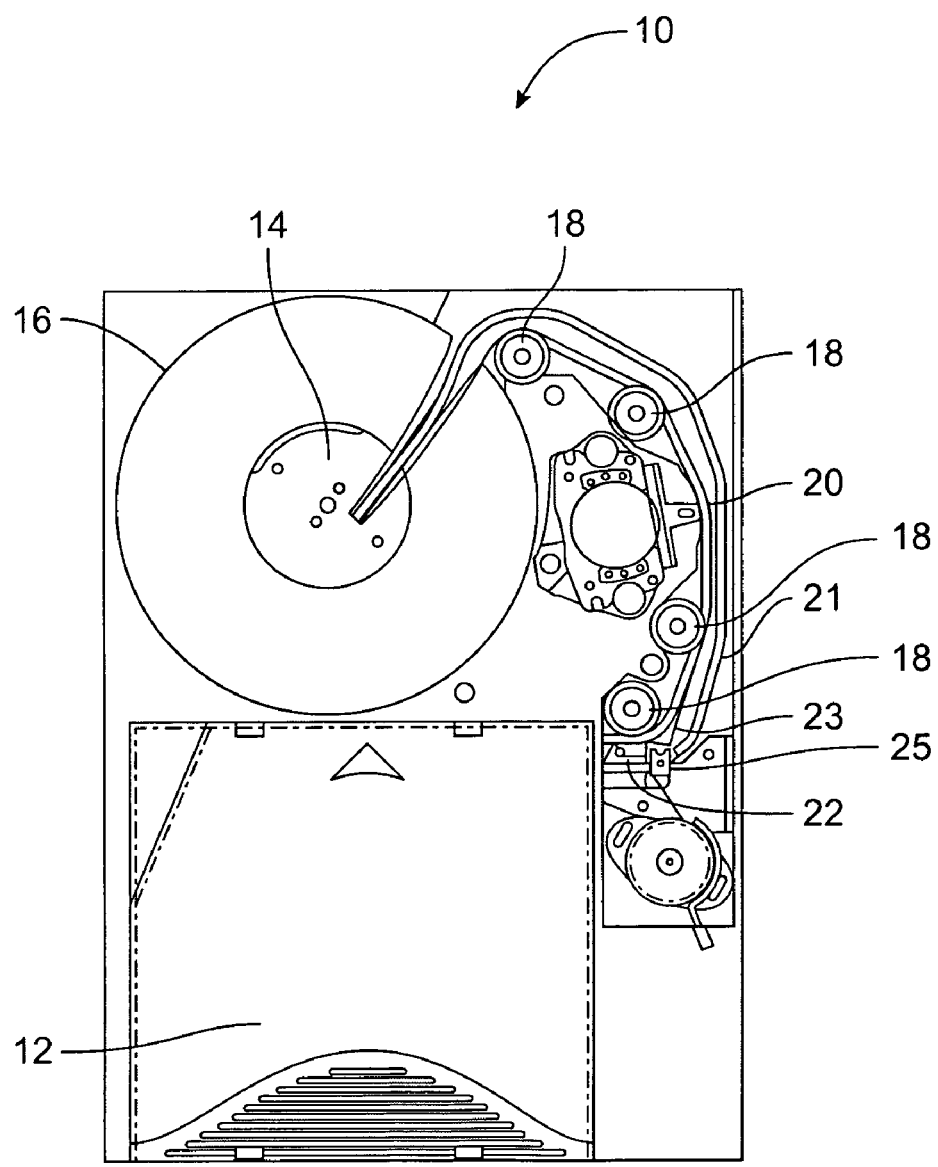
FIG. 1 is a cut-away plan view of certain components of a tape drive constructed in accordance with embodiments of the present invention.

FIG. 1 depicts a cut-away top view of a tape drive constructed in accordance with embodiments of the present invention. Tape drive 10 receives a single reel tape cartridge 12 known to those of ordinary skill in the art. Tape from the tape cartridge 12 is threaded by the tape drive 10 into the take-up hub assembly 14 of a take-up reel 16. The threading of the tape is guided by tape guides 18, with the tape being guided past a recording head 20.

The tape in the tape cartridge 12 has a leader pin (not depicted in FIG. 1) attached to one end of the tape. In order to thread the tape, a leader pin holding assembly (hereafter "LPHA") 22 captures and retains the leader pin. After retention of the leader pin within the LPHA 22, the LPHA 22 is guided along a guide track 21 into the take-up hub assembly 14. The movement of the LPHA 22 into the tape cartridge 12 to capture the leader pin, as well as the movement of the LPHA 22 out of the tape cartridge 12, is provided by an LPHA manipulator mechanism 25.

FIGS. 2a and 2b provide perspective views of an LPHA 22 constructed in accordance with embodiments of the present invention, as seen from opposite sides of the LPHA 22. FIG. 3 depicts an exploded view of the LPHA 22.

The LPHA 22 includes body 24 to which a capture element 26 is movable with respect to the body 24. In the illustrated exemplary embodiment, the capture element 26 is a "swing" that is pivotally mounted to the body 24 so as to swing between open and closed positions.

The swing 26 is pivotally mounted to the body 24 by a hinge pin 28 that extends through bore 40 of the body and bore 44 of the swing 26. The hinge pin 28 extends above and below the body 24 and mounts within the guide track 21. The hinge pin 28 and bore 40 in the body 24 are sized to have an interference fit. The hinge pin 28 and the bore 44 of the swing 26 are sized to have a slip fit to allow rotation of the swing 26 around the hinge pin 28.

A biasing element 30, configured as a spring 30 in the exemplary illustrated embodiment, is mounted on the hinge pin 28 in a cut-out 29 of the swing 26. The spring 30 bears on the swing 26 and the body 24 and is biased to exert a closing force on the swing 26.

A rear pin 32 is inserted through bores 42 of the body 24. The swing 26 includes a pivot portion 39 in which a leader attachment section 38 is provided. Swing 26 also includes a reel portion 36 having an arc shape that will maintain the cylindrical shape of the take-up hub assembly 14 when the LPHA 22 is inserted into the take-up hub assembly 14.

A leader pin opening 34, as best seen in FIG. 2b, is formed between the swing 26 and the body 24 when the swing 26 is in the closed position. The complete, or substantially complete, surrounding of the leader pin by the LPHA 22 provides a secure retention of the leader pin.

Figure 4A:
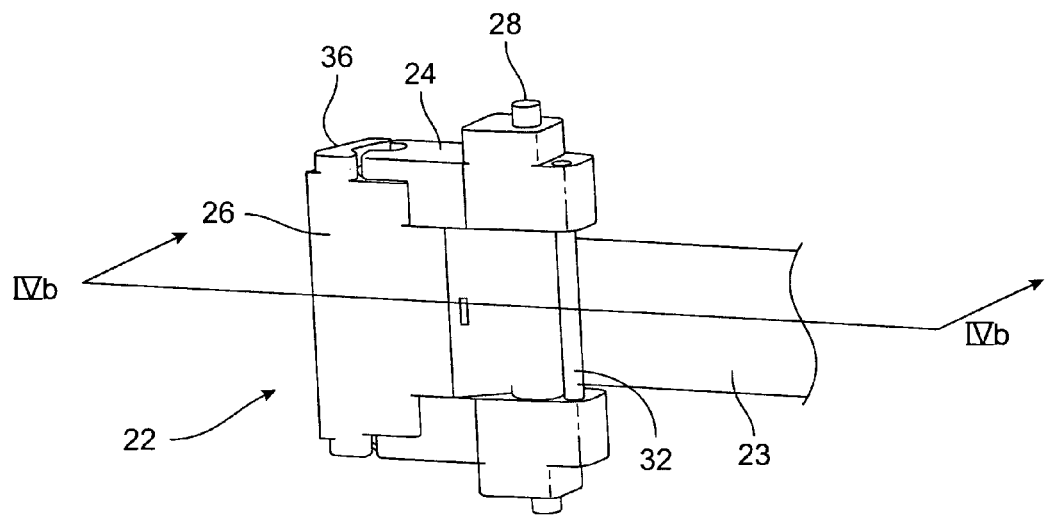
FIG. 4a is a perspective view of the leader pin holding assembly of FIG. 2 in a closed position.
Figure 4B:
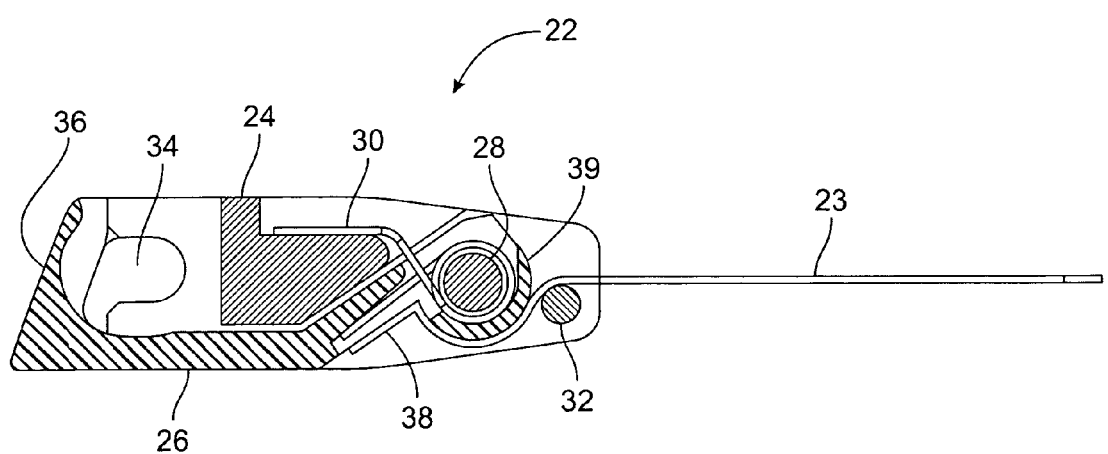

FIGS. 4a and 4b depict the LPHA 22 in a closed position. The hub leader 23 is attached, by adhesive or other means, to the leader attachment of section 38 of the pivot portion 39 of the swing 26. The hub leader 23 is threaded through a gap between the pivot portion 39 of the swing 26 and the rear pin 32 of the LPHA 22.

Figure 5A:
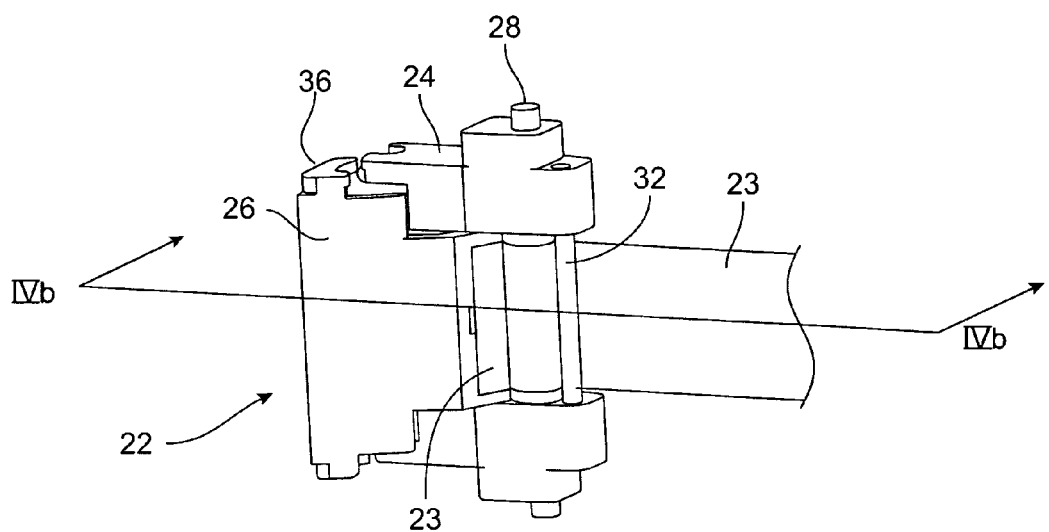
FIG. 5a shows the leader pin holding assembly of FIG. 4a, but in an open condition.
Figure 5B:
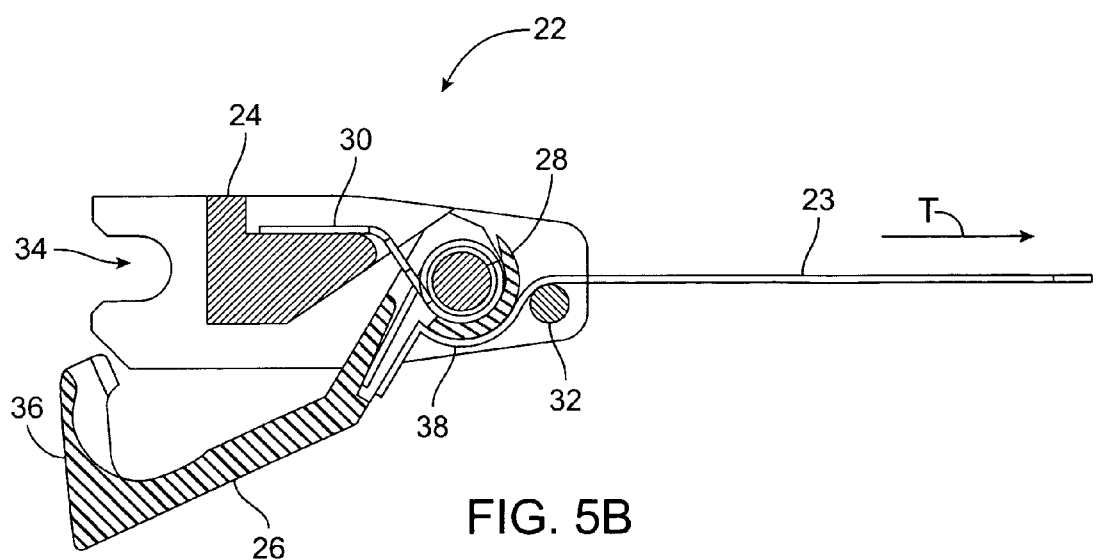
FIG. 5b is a cross-section of the structure depicted in FIG. 5a, taken along line Vb—Vb.

When tension is applied to the hub leader 23, as depicted in FIGS. 5a and 5b, in the direction of arrow T, the swing 26 is pivoted into an open position from its closed position. Hence, the swing 26, acting as a capture element, is swung open under the control of the tensioning of the hub leader 23. The opening force is counter to the closing force applied by the spring 30 or other biasing element that may be provided. The hub leader 23 applies the tension under the control of the take-up hub assembly 14 to which the hub leader 23 is attached. In certain embodiments, an external mechanism may be employed to which the hub leader would be attached to control the opening and closing of the swing 26 with respect to the body 24. However, the elimination of an external mechanism serves to reduce complexity and to minimize size requirements.

Figure 6:
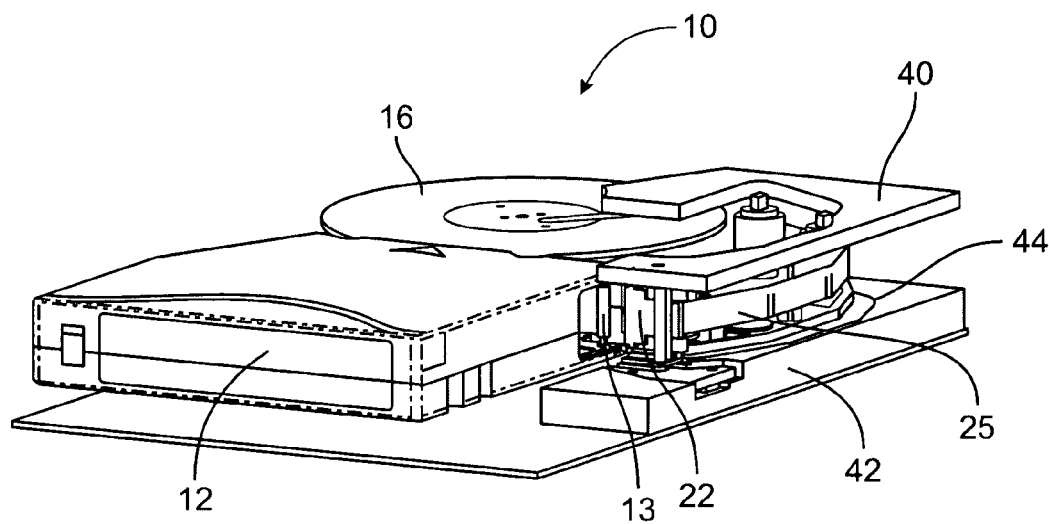
FIG. 6 is a perspective view of a tape drive apparatus depicting certain components of a tape drive constructed in accordance with embodiments of the present invention.

FIG. 6 shows a perspective view of the tape drive 10 and the positioning of the LPHA 22 between a base track plate 42 and an upper track plate 40. The guide slot 44 in the base track plate 42 is depicted, with the guide slot in the upper track plate 40 not being shown in FIG. 6. The ends of the hinge pin 28 with the LPHA 22 are guided in the guide slot 44 (and in the guide slot not shown) in the track plates 42, 40. The leader pin 13 of the tape cartridge 12 is depicted in FIG. 6.

Figure 7:
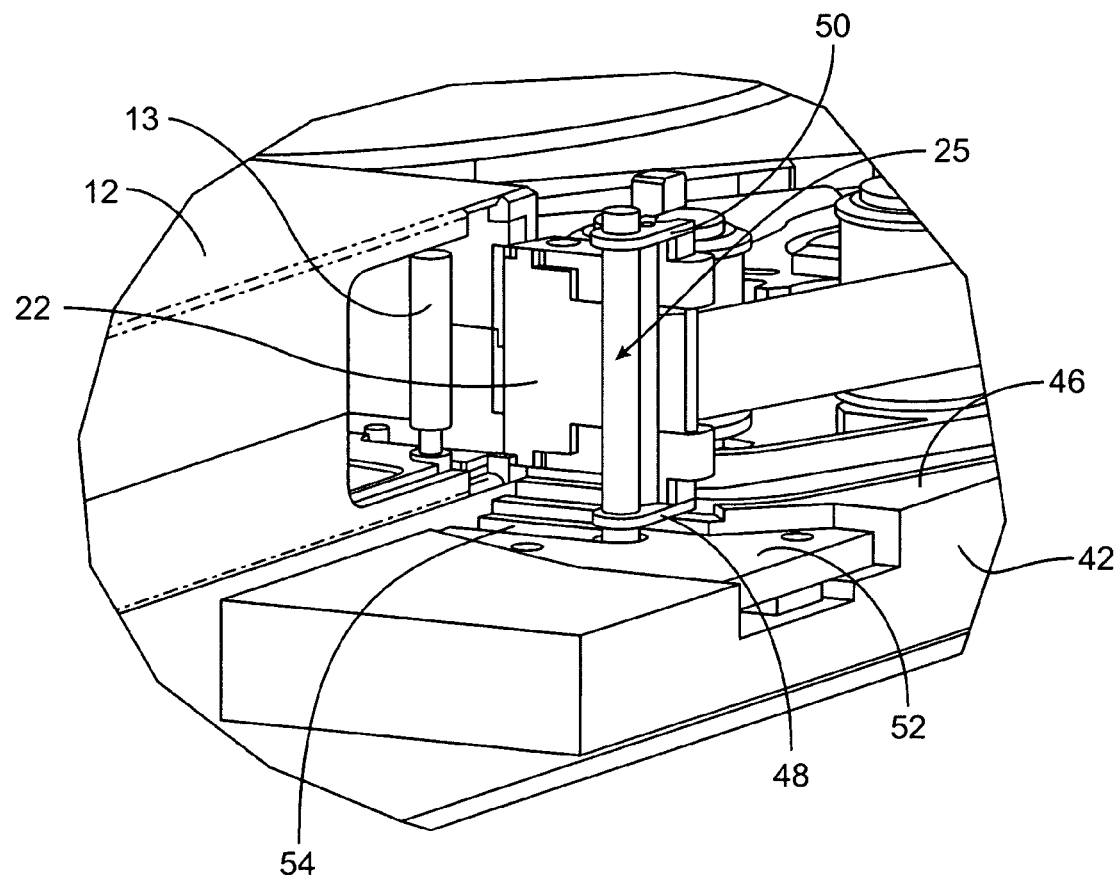
FIG. 7 is a detailed perspective view of a portion of the tape drive depicted in FIG. 6, with an upper track plate removed for illustration purposes.

FIG. 7 shows a detail of a portion of FIG. 6, with the upper track plate 40 removed for illustration purposes. In the tape drive 10, the LPHA 22 is located between the upper track plate 40 and the base track plate 42. These two plates 40, 42 are separated by a distance slightly greater than the distance between the upper and lower flat surfaces of the LPHA 22. In each plate 40, 42, there are identical slots that are slightly larger in width than the diameter of the hinge pin 28 protruding from the LPHA 22. The hinge pin 28 is fitted into the slots (guide slot 44 in FIG. 6), which serve as guides for the LPHA 22 throughout its travel.

Figure 8:
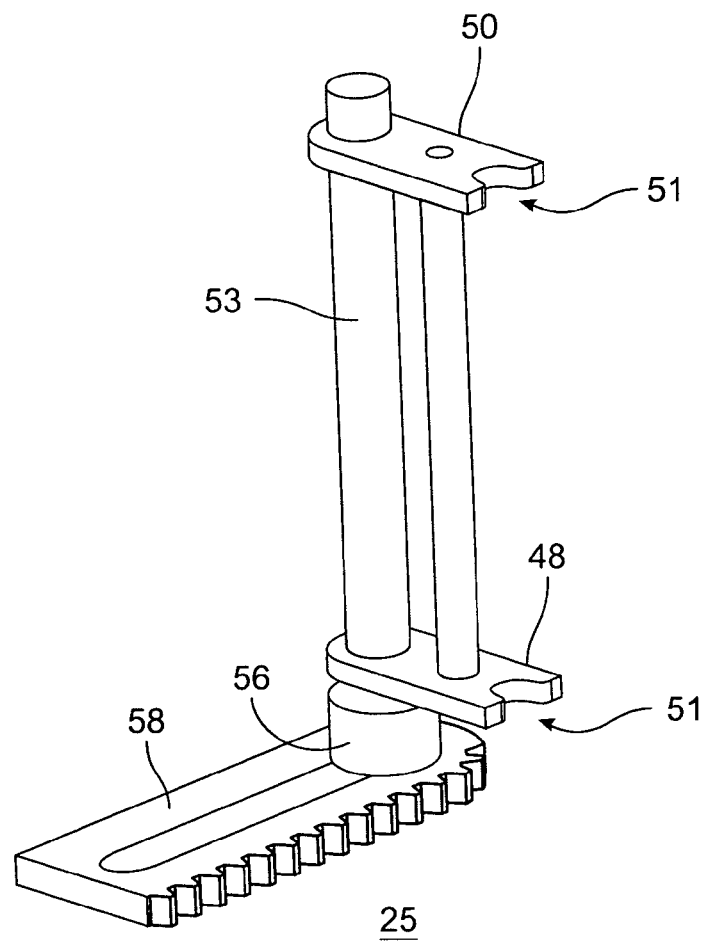
FIG. 8 is a perspective view of a leader pin holding assembly manipulator constructed in accordance with embodiments of the present invention.

The LPHA manipulator 25 is depicted in isolation in FIG. 8, and shown in FIG. 7 as coupled to the LPHA 22. Manipulator 25 fits between the two track plates 40, 42. A manipulator guide plate 52 operates with the LPHA manipulator 25 to capture and guide the LPHA 22. A slotted feature (not shown) is provided in the upper track plate 40 and serves as a guide for the LPHA 22. Manipulator guide plate 52 is mounted to the base track plate 42. The slot 54 in the guide plate 52 serves as guidance for the LPHA manipulator 25.

The manipulator 25 has two fork plates 48, 50 mounted on a rotatable main shaft 53. The main shaft 53 and fork plates 48, 50 are rotationally mounted by a rotary boss 56 on a gear rack 58.

The two fork plates 48, 50 on the manipulator 25 are set flush with the two slotted surfaces in the base track plate 42 and the upper track plate 40. This allows the LPHA 22 to fit between the two fork plates 48, 50. The fork plates 48, 50 have openings sized to fit the diameter of the hinge pin 28 protruding from the upper and lower surfaces of the LPHA 22.

Figure 9A:
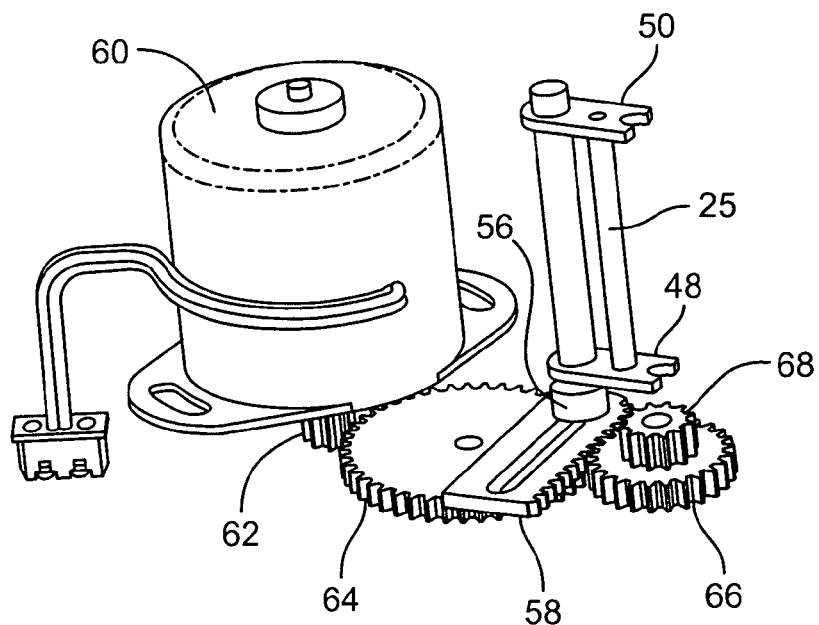
FIG. 9a is a perspective view of the manipulator gear train assembly constructed in accordance with embodiments of the present invention.
Figure 9B:
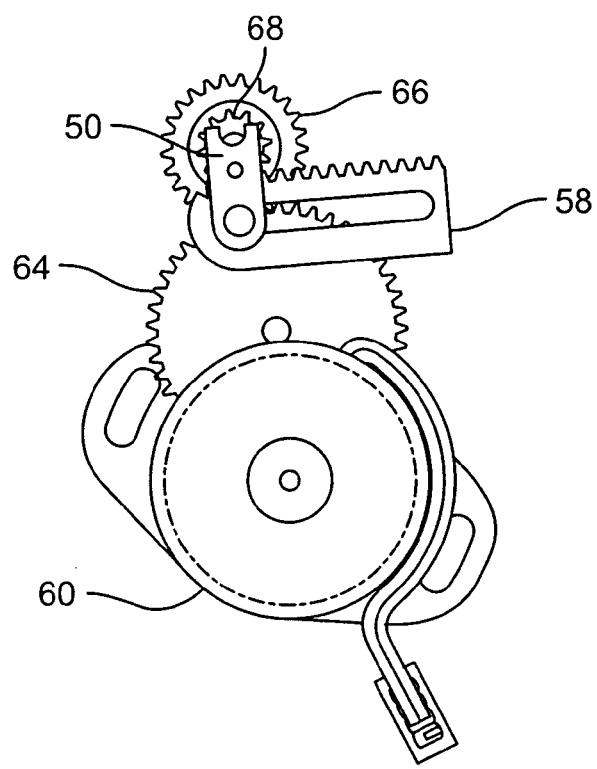

FIGS. 9a and 9b depict an exemplary embodiment of a gear train for the manipulator 25. Motor 60 is connected through a motor pinion 62 to a transition gear 64. A drive gear 66 interacts with the transition gear 64. A pinion gear 68 interacts with the gear rack 58 connected to the LPHA manipulator 25. Under control of the motor 60, the LPHA manipulator 25 is translated and rotated, as will be described especially with respect to FIGS. 10–16.

Figure 10:
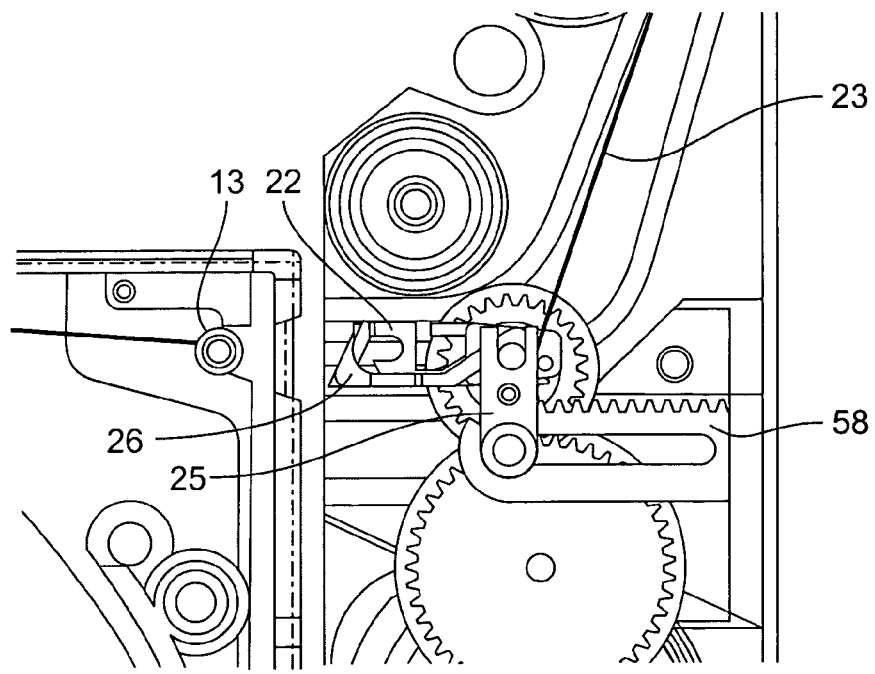
FIGS. 10–16 depict a top view of the capture and retention of a leader pin of a single reel cartridge employing embodiments of the present invention.
Figure 11:
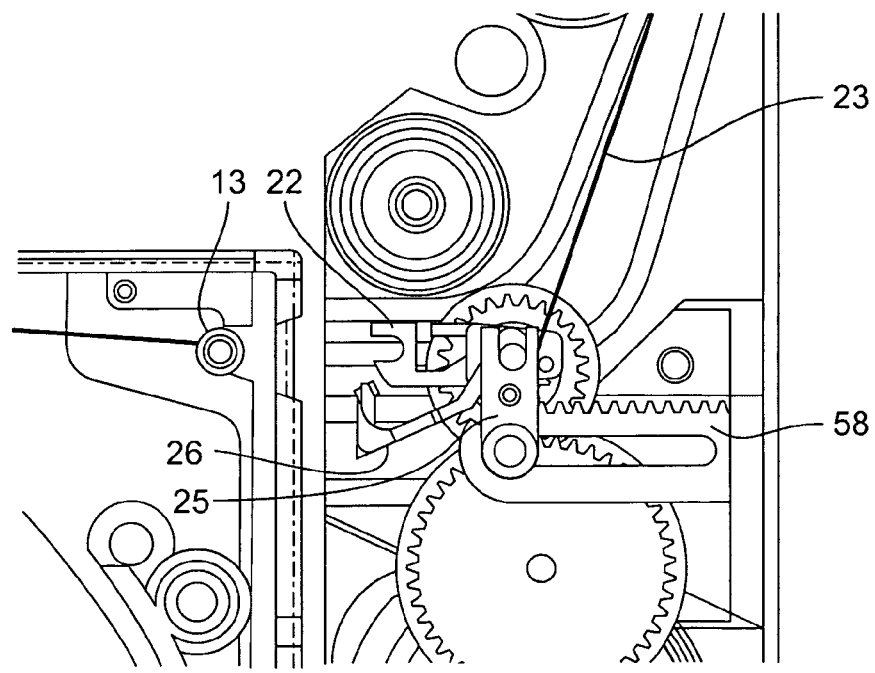

In operation, a tape cartridge 12 is loaded into the tape drive 10, and positioned as depicted in FIG. 1. The tape door (not shown) on the tape cartridge 12 is opened so that the leader pin 13 is exposed and ready for tape threading. Referring now to FIG. 10, the LPHA 22 is held by the forks 48, 50 in the manipulator 25. Tension is applied to the hub leader 23 while the LPHA 22 is held in the manipulator 25. Since the LPHA 22 is held in a fixed position and tension is applied to the hub leader 23, the swing 26 of the LPHA 22 pivots away from the body 24 to an open condition depicted in FIG. 11 (also seen in FIGS. 5a and 5b). The tension is applied to the hub leader 23 by the control of the take-up assembly 14 in the exemplary embodiment of the invention.

Figure 12:
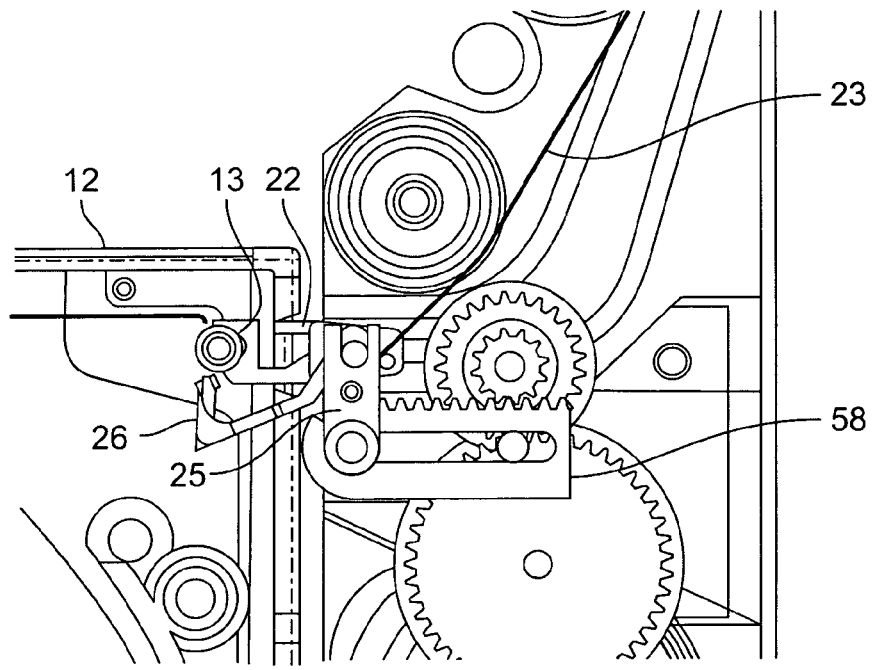

The manipulator gear train (shown in isolation in FIGS. 9a and 9b) moves the LPHA manipulator 25 to cause the LPHA 22 to move into the opening of the cartridge 22. The LPHA 22 is moved into the cartridge 12 to the point such that the necks of the leader pin 13 are deep inside the leader pin openings 34 of the body 24 of the LPHA 22, as shown in FIG. 12. During the movement of the manipulator 25 to cause the LPHA 22 to move into the opening of the tape cartridge 12, continued tension is applied to the hub leader 23 to maintain the swing 26 in the open position.

Figure 13:
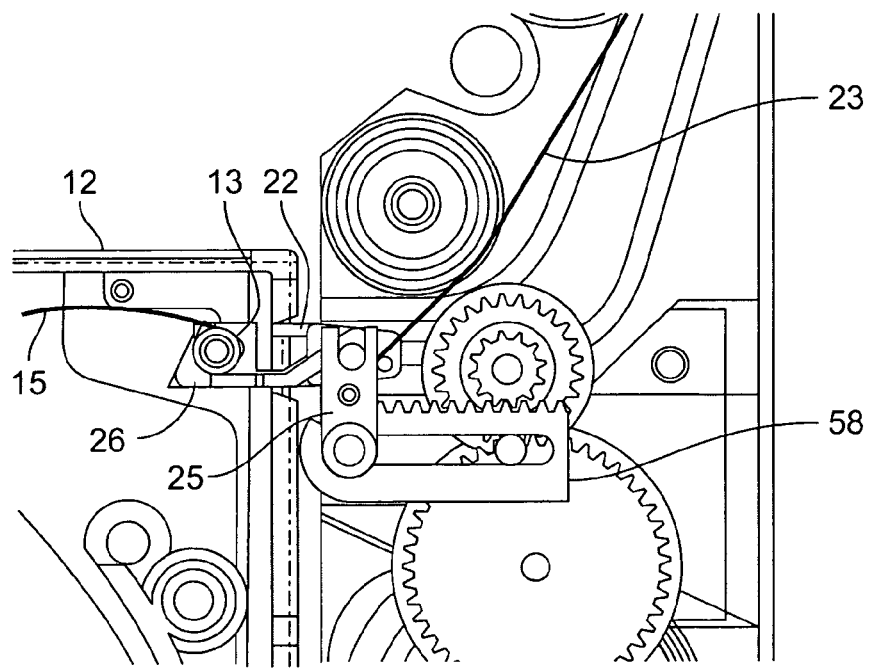
Figure 14:
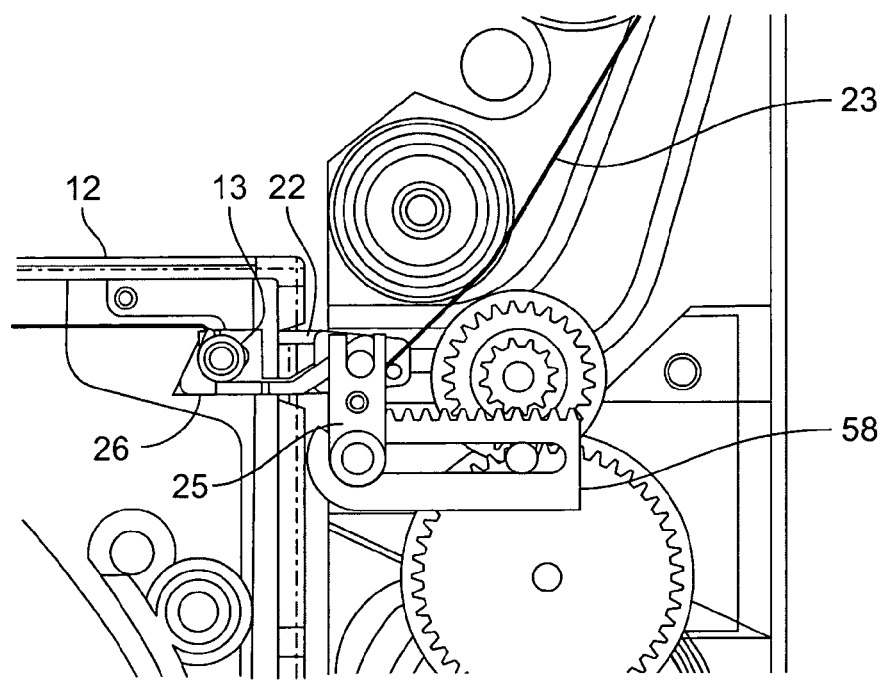
Figure 15:
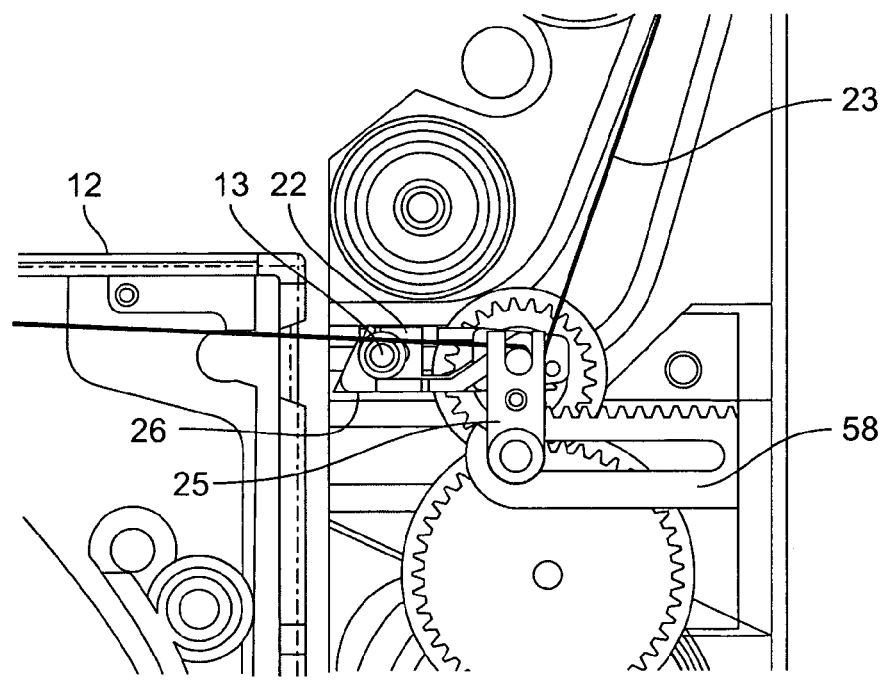
Figure 16:
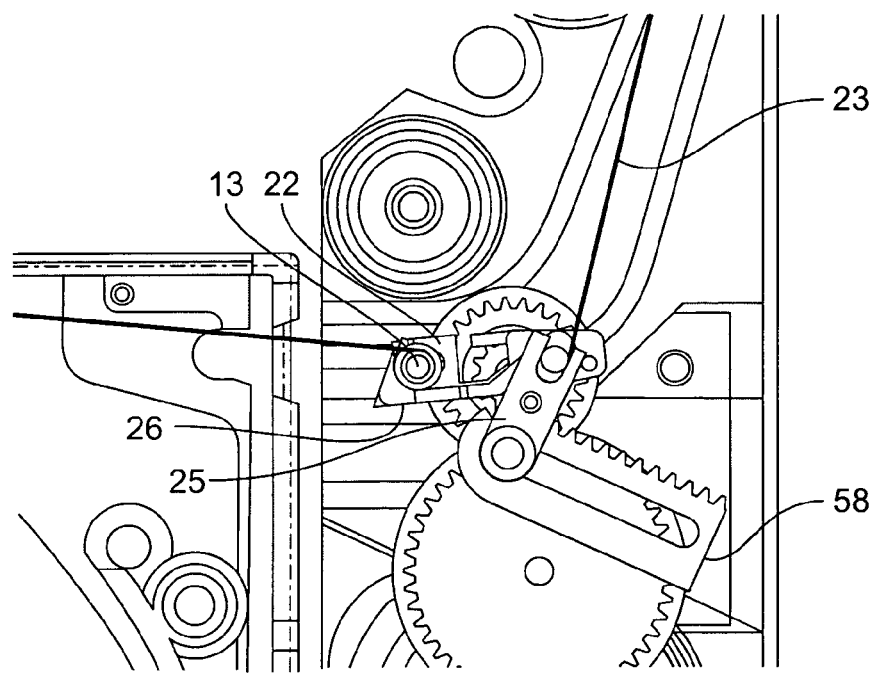

Once the leader pin 13 is deep inside opening 34 of the LPHA 22, the tension on the hub leader 23 is reduced by control of the take-up hub assembly 14 so that the swing 26 rotates to the closed position (see FIGS. 4a and 4b), while the tension on the tape leader 15 within the tape cartridge 12 is reduced to near zero, as shown in FIG. 13. With low tension on the hub leader 23 of the tape leader 15, the manipulator 25 moves the LPHA 22 a small amount in a direction out of the cartridge 12. Once the leader pin is against the inside of the swing 26, as depicted in FIG. 14, tension can be increased slightly to take out slack in the tape leader 15. With minor tension on the tape leader 15, the leader pin 13 cannot escape the LPHA 22 because the swing 26 is blocked from opening by the tab of swing 26 against the leader pin 22. The manipulator gear train moves the gear rack 58 and the manipulator 25 to pull the LPHA 22 with the leader pin 13 and tape to a point where the manipulator 25 begins to rotate, as seen in FIG. 15. The manipulator 25 continues to rotate to a position, depicted in FIG. 16, that positions the opening of the fork plates 48, 50 of the manipulator 25 to release the LPHA 22 from the grasp of the manipulator 25. The hub leader 23 is then able to pull the LPHA 22 with the leader pin 13 and the tape 15 to the take-up hub assembly 14.

Figure 17:
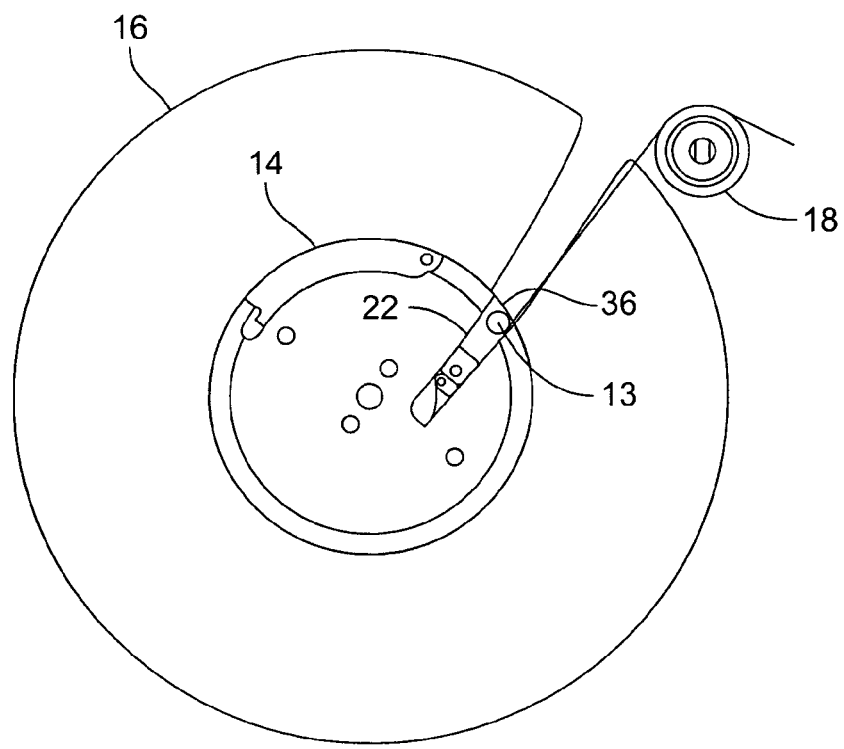
FIG. 17 depicts a leader pin holding assembly inserted into the hub assembly of a take-up reel in accordance with embodiments of the present invention.

FIG. 17 shows the LPHA 22 inserted inside the take-up hub assembly 14. The outer cylindrical surface 36 of the swing 26 of the LPHA 22 matches the outer diameter of the hub assembly 14.

The sequence of operation is reversed in order to return the leader 13 to the tape cartridge 12.

The present invention thus provides a tape drive apparatus with an arrangement for capturing, retaining, and releasing a leader pin from a tape cartridge that utilizes a minimum amount of external actuators, grabs and releases the leader pin only when in the cartridge, maintains a hold of the leader pin regardless of tension, and fits into the take-up reel in a manner that maintains the cylindrical nature of the take-up reel.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A tape drive with an arrangement for capturing and retaining a leader pin from a tape cartridge, comprising:
    a) a holding assembly having a body and a capture element movable with respect to the body between an open position to capture the leader pin and a closed position to retain the leader pin within the holding assembly between the capture element and the body, wherein the capture element is pivotally mounted to the body to swing between the open and closed positions;
    b) a biasing element mounted on the holding assembly and configured to bias the capture element towards the closed position;
    c) a control element coupled to the capture element to control movement of the capture element between the open and closed positions, wherein the control element is a hub leader attached to the capture element such that application of tension to the hub leader causes the capture element to pivot to the open position counter to the biasing of the capture element by the biasing element.

2. The apparatus of claim 1, further comprising a hinge pin extending through the capture element and the body to pivotally mount the capture element to the body.

3. The apparatus of claim 2, wherein the biasing element is a spring mounted on the hinge pin and bears against the capture element and the body.

4. The apparatus of claim 3, wherein the capture element has a reel portion configured with an arcuate shape that maintains a cylindrical shape of a take-up reel into which the capture element has been inserted.

5. The apparatus of claim 4, further comprising a manipulator configured to couple to the holding assembly and move the holding assembly between a leader pin capture and release position and a guide track position for guidance of the holding assembly to and from a take-up reel.

6. The apparatus of claim 5, wherein the manipulator includes at least one fork engageable with the hinge pin to couple the manipulator to the holding assembly.

7. The apparatus of claim 6, further comprising a drive arrangement coupled to the manipulator to drive the manipulator to move the holding assembly between the leader pin capture and release position and the guide track position.

8. A tape drive comprising:
    a) a take-up reel;
    b) a leader pin holding assembly having a body and a swing pivotally coupled to the body, with a leader pin opening formed between the swing and the body when the swing is in a closed position;
    c) a spring coupled to the swing to bias the swing into the closed position; and,
    d) control element coupled to the swing to control movement of the swing between an open position and the closed position, wherein the control element is a hub leader attached to the swing.

9. The tape drive of claim 8, further comprising a manipulator configured to receive the leader pin holding assembly and move the leader pin holding assembly at least partially into a tape cartridge.

10. The tape drive of claim 9, wherein the hub leader is attached to the swing such that application of tension to the hub leader causes the swing to pivot to the open position counter to the biasing of the swing by the spring.

* * * * *